US005192048A

United States Patent [19]

Wakeman

[11] Patent Number: 5,192,048

[45] Date of Patent: Mar. 9, 1993

[54] FUEL INJECTOR BEARING CARTRIDGE

[75] Inventor: Russell J. Wakeman, Newport News, Va.

[73] Assignee: Siemens Automotive L.P., Auburn Hills, Mich.

[21] Appl. No.: 905,580

[22] Filed: Jun. 26, 1992

[51] Int. Cl.[5] .......... F16K 31/02

[52] U.S. Cl. .......... 251/129.16; 251/129.15; 239/585.3; 239/585.5

[58] Field of Search .......... 251/129.15, 129.16; 239/585.1, 585.3, 585.4, 585.5

[56] References Cited

U.S. PATENT DOCUMENTS 1,323,778 12/1919 Lemp .......... 251/129.16 X
2,930,404 3/1960 Kowalski et al. .......... 251/129.16 X
3,241,768 3/1966 Croft .......... 239/585.3 X
3,773,265 11/1973 Kent .......... 239/585.4
4,610,080 9/1986 Hensley .......... 239/585.4 X
5,083,747 1/1992 Schmitt-Matzen .......... 251/129.15 X
5,102,095 4/1992 Schmitt-Matzen et al. ... 251/129.15 X
5,114,077 5/1992 Cerny .......... 251/129.16 X

*Primary Examiner*—John Rivell
*Attorney, Agent, or Firm*—George L. Boller; Russel C. Wells

[57] ABSTRACT

Two annular guide bearings that guide the needle are mounted in a tube which is disposed in a bore of the valve body, rather than being mounted directly on the valve body bore. This arrangement affords the opportunity for better alignment the bearings with the solenoid actuator and with the valve seat.

10 Claims, 1 Drawing Sheet

FUEL INJECTOR BEARING CARTRIDGE

FIELD OF THE INVENTION

This invention relates generally to electrically operated valves, such as fuel injectors for injecting fuel into an internal combustion engine, and particularly to a bearing cartridge for such a valve.

BACKGROUND AND SUMMARY OF THE INVENTION

The movement of certain electrically-operated valves, such as certain fuel injectors, comprises a needle that is reciprocated axially within the interior of the valve's body in response to electrical energization and de-energization of an electro-mechanical actuator to thereby selectively open and close a flow path through the valve. The needle of some fuel injectors has a rounded tip end that, when the actuator is not energized, seats on a frusto-conical valve seat at the fuel injector's nozzle end to close a flow path through the fuel injector. When the actuator is energized, the needle is axially displaced to unseat its tip end from the seat and thereby open the flow path. The typical actuator is a solenoid that is mounted on the valve body and that has a guided armature to which the needle is operatively connected.

Such a fuel injector also comprises two axially spaced apart bearings that, in conjunction with the guided armature provide guidance for the axial reciprocation of the needle. For assuring proper operation and avoiding leakage when the flow path is closed, the precision and alignment of such bearing arrangements is vital. First, the bearings individually need to be highly circular. Second, they must be highly concentric, not just with each other, but also with the guided armature and the valve seat. Third, the bearings' cylindricity must be highly precise, particularly, if they have a significant length/diameter ratio. Lack of precision in the individual bearings and in their mounting arrangement on the valve body is apt to lead to loss of a fuel injector's performance. For example, faults may appear as objectionable wear, if the tolerance in the clearance of the fit between the needle and the bearings is not sufficiently strict; as objectionable leakage, if the bearings are eccentric to the valve seat, even if the bearings themselves are correctly mutually concentrically aligned; as needle jamming, if the bearings are misaligned or lack proper cylindricity; or as erratic dynamic flow, if the bearing/needle clearance is too loose and the bearings are not sufficiently precisely aligned.

Since the bearings mount on the valve body, the process of manufacturing the valve body and/or the valve body's constructional features may have an effect on the ability to secure precise bearing alignment. For instance, constructional features that are required for the valve body may impair the ability to process its manufacture in a way that is most conducive to securing a precise bearing alignment. For example, features of interest, such as bores for the bearings, are typically disposed far apart axially with the intent of providing maximum needle stability. Consequently, they are typically machined from opposite axial ends of the valve body, a process that is ordinarily completed only after multiple chuckings of the valve body. Such procedures of chucking the part, machining one end, and then rechucking the part to machine the opposite end, inherently create some loss of accuracy. Moreover, when the outside diameter of the valve body is rough-machined by a form-tool, as it typically is for expediency, such processing may not provide sufficiently precise surfaces to which the machining of the bores for the bearings can be referenced. Thus, while it is desired that the bearing bores be spaced axially far apart for needle stability, the fact that they are machined in the manner just described undercuts the ability to attain greater precision in bearing alignment.

Accordingly, it is seen that a need exists for improving on the existing state of the art.

This need is met by providing a bearing cartridge according to the present invention. The bearings are disposed in a metal tube that is itself disposed in a bore in the valve body. The metal tube is machined to have very accurate I.D. and O.D. cylindricities and concentricity. One end of the tube is accurately counterbored to accept one bearing and a valve seat which have previously been joined together to form a bearing/seat assembly. The opposite end of the tube is also counterbored slightly larger than the outside diameter of the other bearing to allow the latter to float radially during its assembly to the tube so that it will align to the first bearing. The two bearings can thus be precisely mutually aligned, since both are installed in the tube with reference to a diameter that was accurately machined in a single chucking of the tube. The bearings and tube constitute the bearing cartridge.

The bearing cartridge can itself be accurately installed in the valve body since it has a precision O.D. and since those features of the main bore in the valve body that control the accuracy of cartridge installation can themselves be accurately machined in a single chucking of the valve body. The fact that the invention provides a fuel injector with a separate bearing cartridge opens some new processing options. The cartridge can be tested as a unit before it is assembled into the valve body, and in the unlikely event that errors are detected, the cartridge can be scrapped thereby avoiding the necessity of scrapping a completed fuel injector. Likewise, leakage testing of a cartridge/needle/actuator sub-assembly combination can be performed before final assembly into a fuel injector thereby avoiding the possibility of having to scrap completed fuel injectors if such testing is performed later and reveals that leakage is unacceptable.

The use of a cartridge also allows the valve lift to be set without the use of a lift shim, as described in commonly assigned U.S. Pat. No. 4,610,080. With the actuator fixed on the valve body, axial positioning of the cartridge will be effective to adjust the lift with all components, save the cartridge, in final position. When the correct lift is measured, the cartridge is fixed in place, such as by welding. If such welding is performed hermetically, it can seal the O.D. of the cartridge to the valve body, eliminating an otherwise required O-ring seal.

The invention, and the features, advantages, and benefits that characterize it, are disclosed in the following detailed description of a presently preferred embodiment that illustrates the best mode contemplated at this time for carrying out the invention. The description is accompanied by drawings.

DESCRIPTION OF THE PREFERRED EMBODIMENT

Figure 1:
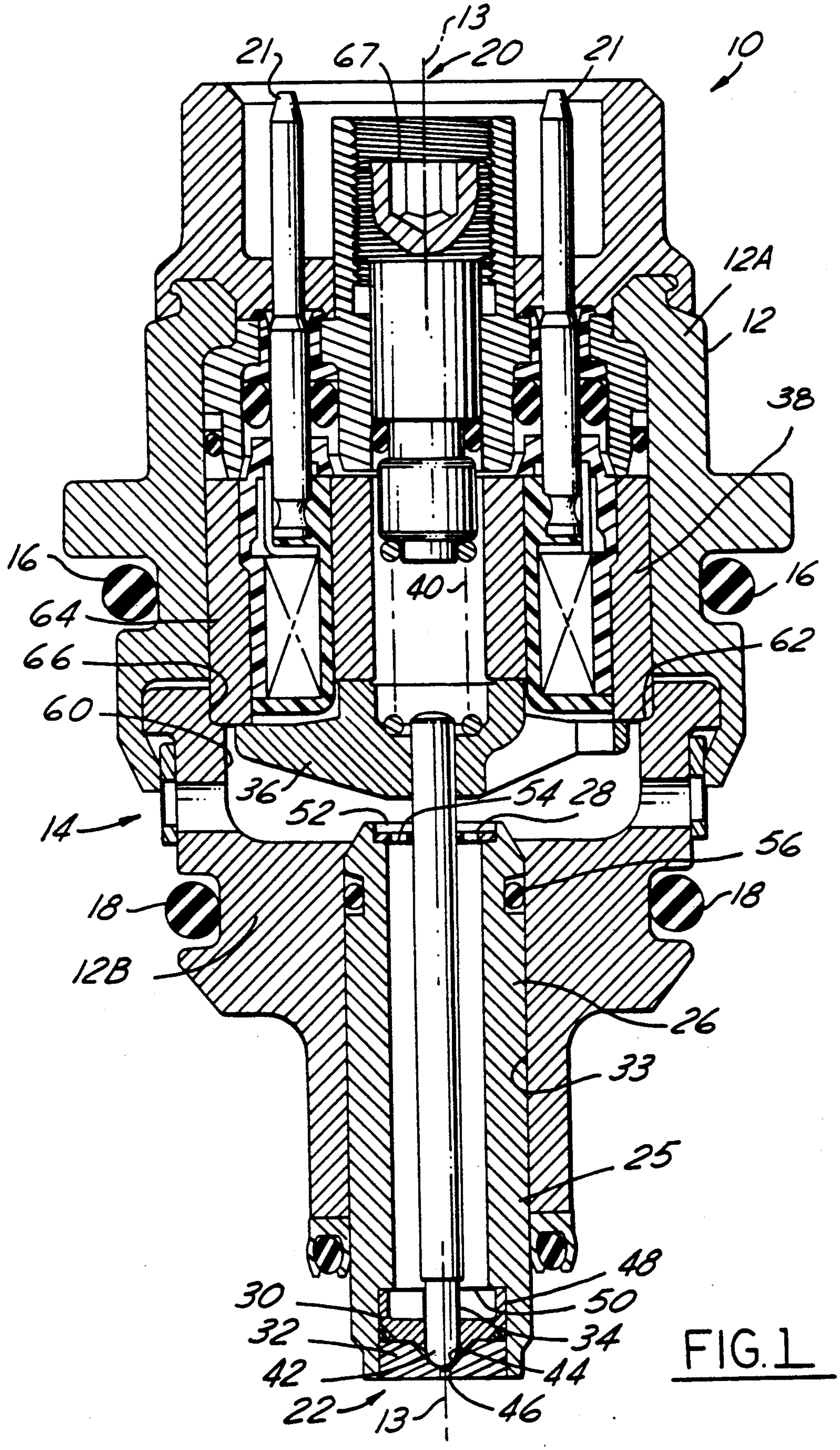
FIG. 1 is a longitudinal cross sectional view of an exemplary fuel injector embodying principles of the invention.

FIG. 1 illustrates a representative fuel injector 10 having a generally cylindrical valve body 12 of non-magnetic material such as non-magnetic stainless steel. Valve body 12 has a main longitudinal axis 13. Radial holes through the sidewall of valve body 12 are covered by a filter screen to form the fuel injector's inlet 14. The inlet is axially bounded by O-ring seals 16, 18 that seal to the sidewall of a socket of a cylinder head or manifold (not shown) into which the fuel injector is inserted when in use. This configuration for the inlet is representative of what is sometimes referred to as a side-feed injector.

Body 12 has an upper end 20 that is closed but has electrical terminals 21 extending in sealed manner through the closure for connection to a source of electric current for operating the fuel injector. Body 12 also has a lower end that forms an outlet nozzle 22, which is actually part of the bearing cartridge 25 of the present invention.

Cartridge 25 comprises a metal tube 26, an upper guide bearing 28, a lower guide bearing 30, and a valve seat member 32. The latter two parts 30 and 32 are joined together to form a bearing/seat sub-assembly that is assembled into the lower end of tube 26, and that is suitably sealed to the wall of the tube so that fuel cannot leak past the installed sub-assembly. Cartridge 25 is disposed in a bore 33 of valve body 12 that is coaxial with axis 13.

The movement of fuel injector 10 comprises a needle 34 and an armature 36. The actuator of the fuel injector comprises a solenoid 38, which in cooperation with a bias spring 40, operates the movement. Needle 34 passes through guide bearings 28 and 30. The needle's upper end is attached to the center of armature 36; its lower end contains a rounded tip 42. FIG. 1 shows the fuel injector in closed condition with solenoid 38 not energized so that spring 40 forces tip 42 to seat on a central frusto-conical seat 44 in the upper face of valve seat member 32, closing a small hole 46 leading from the bottom of seat 44 to the lower face of seat member 32. When solenoid 38 is energized by suitable electric current, it exerts an attractive force on armature 36 that overcomes the spring bias force so that as a result tip 42 is unseated to open hole 46. In use, the fuel injector is operated by repeatedly pulsing solenoid 38 to reciprocate needle 34 in suitably timed relation to operation of the engine combustion chamber with which it is associated.

Both guide bearings 28 and 30 are circular annular in shape having respective central circular holes through which needle 34 passes. They also have further hole structure that allows liquid fuel to pass through them. Valve seat member 32 and lower guide bearing 30 are assembled together to precisely align valve seat 44 with the central circular hole in lower guide bearing 30 such that the two are precisely coaxial.

The I.D. and O.D. of tube 26 are machined to have very accurate I.D. and O.D. cylindricities and concentricity. The lower end of tube 26 is accurately counterbored at 48 to accept the bearing/seat sub-assembly, 30/32 with a precision fit, and after the sub-assembly has been inserted into the counterbore and abutted with an internal shoulder 50 at the upper and of the counterbore, it is joined to the tube in any suitable manner, such as by welding. The upper end of tube 26 is also counterbored at 52, but to a diameter that is slightly larger than the outside diameter of upper guide bearing 28. When the latter has been disposed in this counterbore against an internal shoulder 54 at the lower end of the counterbore, it can float radially so that it can precisely align with guide bearing 30 before it is joined to the tube. A precision fixture is used to secure this alignment, and then the upper guide bearing is joined to the tube. The central holes in the two guide bearings through which needle 34 is to pass have thus been made highly concentric, since both are installed in the tube with reference to a diameter that was accurately machined in a single chucking of the tube.

The O.D. of tube 26 contains a groove in which an O-ring seal 56 is placed prior to insertion of the cartridge into bore 33. This will provide sealing of the cartridge to the bore. If the joining of tube 26 to valve body 12 is performed hermetically to circumferentially seal between the two, it is possible that seal 56 can be eliminated.

Body 12 actually comprises two body parts 12A and 12B that are joined by means of a joint with the internal parts of the fuel injector having been assembled into the interior. Bore 33 is in body part 12B. A diametrically larger bore 60 is also in body part 12B as an upward continuation of bore 33 and includes a ledge 62 just below its upper rim. Solenoid 38 comprises a stator 64 having a lower circular end that is disposed on ledge 62 in the completed fuel injector. Ledge 62 is bounded by the sidewall 66 of a circular counterbore which has been machined into part 12B to be precisely concentric with bores 33 and 60. The lower circular end of stator 64 is machined to fit precisely within sidewall 66 in the finished fuel injector, thus making solenoid 38 precisely concentric with bores 33 and 60, and hence with cartridge 25. By making ledge 62 precisely perpendicular with sidewall 64, and making the lower end face of the stator perpendicular to the sidewall of the stator, the lower end face of the stator will be precisely perpendicular to axis 13. And with needle 34 precisely perpendicular to the surface of armature 36 that radially overlaps the lower end face of stator 64, precise parallelism of the stator/armature interface will be attained, thereby providing a uniform gap around its full circumference, which is typically a desirable attribute in magnetic actuator design.

The valve lift is set before the cartridge is joined to the valve body. The fuel injector is operated and the cartridge is positioned within bore 33 until the proper lift is measured. The cartridge is then joined to the body. An adjustment means 67 that is accessible at the exterior of the upper end of the fuel injector is also provided.

While a presently preferred embodiment of the invention has been illustrated and described, it should be appreciated that principles are applicable to other embodiments.

What is claimed is:

1. An electrically operated valve comprising a valve body, an electro-mechanical actuator that acts through a needle for setting the extent to which the valve is opened, spaced apart bearings on said body acting at axially spaced apart locations on said needle for guiding motion that is imparted to said needle by said actuator, characterized in that said bearings are disposed in a tube that is disposed in a bore in said valve body.

2. A valve as set forth in claim 1 characterized further in that said tube contains counterbores at opposite ends and said bearings are disposed in respective ones of said counterbores.

3. A valve as set forth in claim 2 characterized further in that one of said bearings is joined to a valve seat member to form a sub-assembly that is disposed in one of said counterbores and said needle has a rounded tip that coacts with a valve seat in said valve seat member.

4. A valve as set forth in claim 1 characterized further in that said actuator is a solenoid having an armature to which said needle is attached and a stator that is fitted to a surface of said body that is concentric to said bore within which said tube is disposed.

5. A valve as set forth in claim 1 characterized further in that a flow path through the valve includes said tube, and said bearings have openings through which fluid whose flow passes through said flow path and that is controlled by the valve is allowed to pass.

6. The method of making an electrically operated valve having a valve body, an electro-mechanical actuator that acts through a needle for setting the extent to which the valve is opened, and spaced apart bearings on said body acting at axially spaced apart locations on said needle for guiding motion that is imparted to said needle by said actuator, characterized by disposing said bearings in a tube to form a cartridge and then disposing said cartridge in a bore in said valve body.

7. A method as set forth in claim 6 characterized further by making counterbores at opposite ends of said tube and disposing said bearings in respective ones of said counterbores.

8. A method as set forth in claim 7 characterized further by joining one of said bearings to a valve seat member to form a sub-assembly and disposing said sub-assembly in one of said counterbores.

9. A method as set forth in claim 8 characterized further in that the other of said counterbores has a larger diameter than that of the bearing that is disposed therein so that such bearing can radially float therein, and such bearing is assembled to said tube after said sub-assembly and concentrically aligned with said sub-assembly before such bearing is joined to said tube.

10. A method as set forth in claim 6 characterized further in that said actuator is a solenoid having an armature to which said needle is attached and a stator, including fitting said stator to a surface of said body that is concentric to said bore.

* * * * *